UNITED STATES PATENT OFFICE.

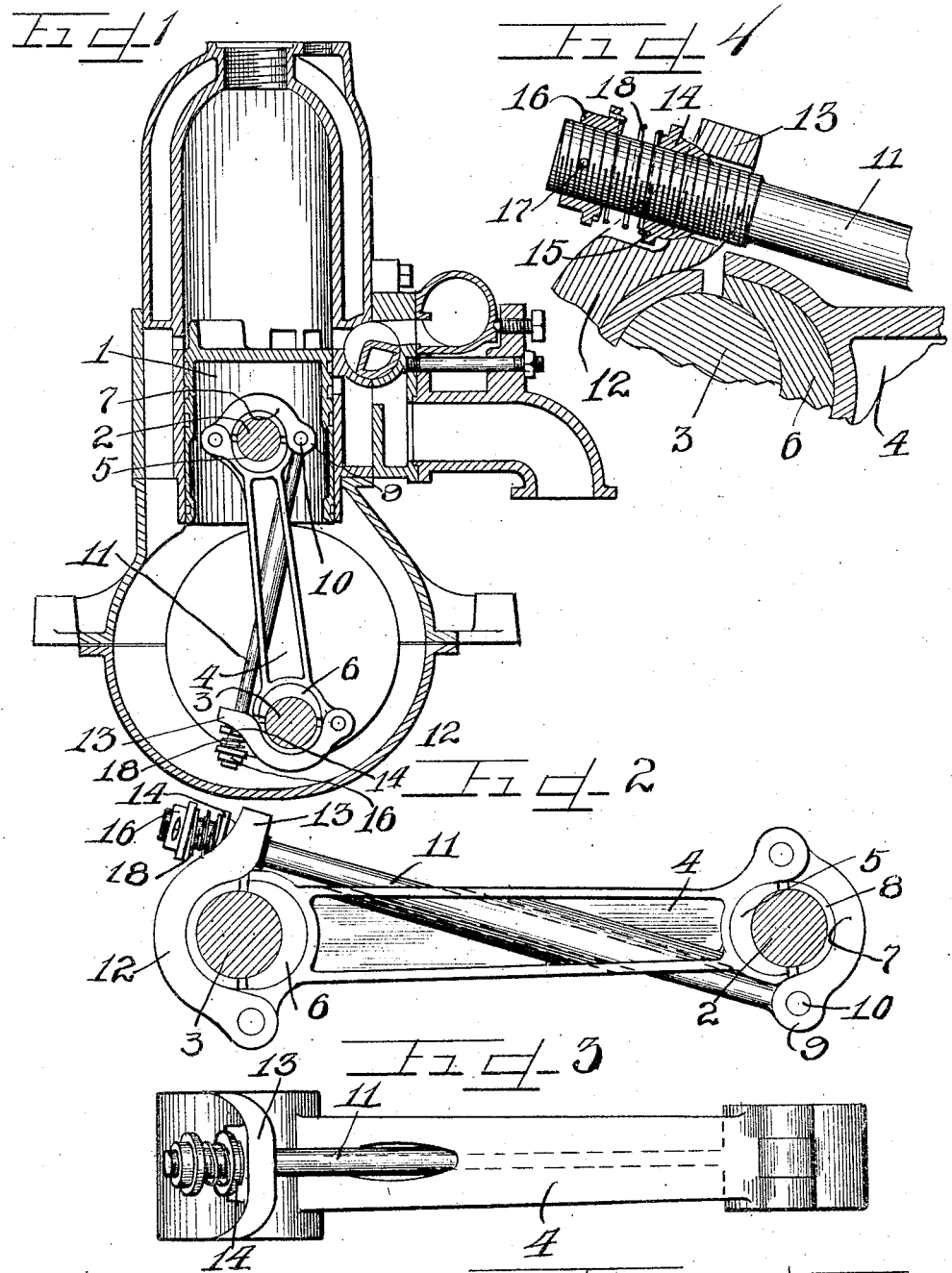

ALBERT E. COOK, OF ODEBOLT, IOWA, AND THOMAS VAN TUYL, OF KANKAKEE, ILLINOIS; SAID VAN TUYL ASSIGNOR TO SAID COOK.

CONNECTING-ROD.

1,196,933.          Specification of Letters Patent.       Patented Sept. 5, 1916.

Application filed September 6, 1912. Serial No. 718,810.

*To all whom it may concern:*

Be it known that we, ALBERT E. COOK and THOMAS VAN TUYL, citizens of the United States, and residents of the city of Odebolt, in the county of Sac and State of Iowa, and Kankakee, Kankakee county, Illinois, respectively, have invented certain new and useful Improvements in Connecting-Rods; and we do hereby declare that the following is a full, clear, and exact description of the same, reference being had to the accompanying drawings, and to the numbers of reference marked thereon, which form a part of this specification.

In the use of internal combustion engines and many other kinds of machinery and mechanisms, the loosening of the bearing bolts sometimes occasioned by the vibration of the machine itself (and sometimes occasioned by journal wear) prove dangerous and destructive to the mechanism and annoying because of the hammer occasioned by such loose connections. Frequent attention has been necessary heretofore to the connecting rod box for internal combustion engines. Such boxes receive the full shock of the explosion of the charge and transmit the same to the crank, and very slight looseness or play in the box may soon destroy a bearing or cause serious accident, inasmuch as the defect rapidly increases in extent with use of the device.

The object of this invention is to afford a construction whereby the connecting rod bearings are automatically self-adjusting to fit respectively the piston pin and the crank, precluding the possibility of injury through hammering.

It is an object of the invention to afford a construction whereby the connecting rod bearings for the piston pin and crank are made self-fitting, and whereby should any looseness occur in either bearing, it will be immediately and automatically corrected.

The invention is illustrated in the drawings in a preferred form, and hereinafter more fully described.

In the drawings: Figure 1 is a central, vertical section of an internal combustion engine provided with connecting rods embodying our invention. Fig. 2 is an enlarged side elevation thereof, with the piston pin and crank in section. Fig. 3 is a front elevation thereof. Fig. 4 is an enlarged fragmentary detail, partly in section.

As shown in the drawings: 1, indicates the piston, 2, the piston pin, and 3, the crank shaft, and the crank of an internal combustion engine.

4, indicates the connecting rod, shaped at its upper and lower end respectively to receive a bearing brass 5 and 6, which fit to the respective piston pin and crank. Hinged on one side of said connecting rod at the upper end thereof, is a cap 7, having a bearing brass 8, therein fitted to the piston pin and on the side thereof opposite the hinge provided with outwardly projected lugs 9, having an aperture therethrough to receive a transverse pin 10, which extends through the upper end of a tension rod 11. Said tension rod extends downwardly and obliquely through said connecting rod, an aperture being provided therefor obliquely through said rod.

Hinged on the lower end of the connecting rod at the side thereof opposite the hinged connection with the upper cap, is a lower box cap 12, which projects beyond the crank 3, and provides a lip 13, having an aperture therein through which the tension rod 11, extends. Said projection or lip 13, is countersunk or shaped on its under side to afford a spherically concave seat, and threaded onto the end of the tension rod, is a nut 14, the end of which is spherically convex and complemental with said seat. Extending into the outer face of said nut or that directed toward the lower end of the tension rod, is an aperture 15. Threaded on said tension rod at the outer end thereof, is a nut 16, and extending therethrough and through a slot in the end of the tension rod, as shown in Fig. 4, is a cotter pin 17, which rigidly holds said nut from turning. A spiral torsion spring 18, is engaged in said aperture 15, in said inner or adjusting nut and in a corresponding aperture in the inner face of the nut 16, and said spring is tensioned by means of the outer nut 16, to exert its torsion upon the adjusting nut to tighten the same.

The operation is as follows: In assembling, the connecting rod is secured in place and the brasses having been fitted to the piston pin and the crank, the tension rod is drawn down by means of the nut 14, to a sufficiently close fit. The spring is next inserted to engage said nut 14, at one end, and the outer nut 16, at the other, and said outer nut is next tightened, thereby winding up the spring 18, to exert its constant torsion upon the adjusting nut 14. Having adjusted the outer nut 16, to afford the desired torsion in the spring, the cotter pin 17, is secured in place, and the device is ready for use.

The entire shock of the explosion and the compression of the charge within the cylinder, is taken on opposite ends of the connecting rod as usual, and not upon the caps, and consequently there is no stress thereby applied upon either the tension rods or the respective caps, and the same is true with reference to the compression within the cylinder, as in four cycle or four stroke engines. Any journal wear occasioned at either end of the journal rod by the operation is immediately taken up by the adjustment of the adjusting nut 14, upon which the constant torsion of the spring 18, is exerted, so that with any vibration whatever in the mechanism, said nut is constantly adjusted inwardly, thereby drawing the caps firmly upon the piston pin and crank, or in other words, tightening the bearing.

Of course, the tension exerted by the spring may be readily adjusted by means of the nut 16, just sufficient to make the bearings at all times sufficiently tight to afford satisfactory operation and to prevent any tendency whatever to hammering.

It is to be understood that the invention is capable of other application than that herein shown and described, and we have shown but a preferred form of the invention, and therefore do not purpose limiting the patent otherwise than necessitated by the prior art.

We claim as our invention:

1. A connecting rod and hinged bearing caps at each end thereof, a pivoted tension rod extending through said rod and connecting said caps, a convex faced nut adjustably mounted on said tension rod and bearing in a complemental recess in one of said caps, forming a ball and socket bearing and torsion means acting automatically on said nut to adjust the tension rod to maintain the connecting rod bearings at all times tight.

2. The combination with the piston pin and crank of an engine of a connecting rod engaged therebetween, bearing caps for said piston pin and for said crank, a tension rod pivotally engaged on the cap at the piston end of said rod and extending loosely through an enlarged aperture in the free end of the cap at the crank end of the rod, a rounded nut adjustably mounted on said tension rod at its lower end and bearing in a complemental recess in said crank cap, and torsion means engaged on said nut and rod and acting automatically to tighten said nut onto the rod thereby drawing said caps to the bearings.

3. In a device of the class described the combination with the piston pin and the crank, of a connecting rod engaged therebetween, a cap hinged at each end of the connecting rod on opposite sides thereof and projecting thereover and fitting respectively to the piston pin and to the crank, a tension rod extending obliquely through the connecting rod and pivotally engaged on the free end of one cap and extending loosely through the other, a convex faced nut threaded on the crank end of said tension rod and seated in a complemental recess in the latter of said caps, means wound around the threaded end of said tension rod and engaging said nut, a nut on the outer end of said tension rod engaging the outer end of said means to wind the same around said tension rod, said means acting to automatically tighten said convex faced nut on said tension rod to take up the caps, and means rigidly securing the said outer nut upon the rod in adjusted position.

4. The combination with a connecting rod of bearing caps therefor hinged thereto, one of said caps countersunk to afford a concave seat, tension means pivoted on one of said caps, and a rounded adjusting nut threaded onto said tension means and complemental with the concave seat, and torsion mechanism secured to said adjusting nut adapted to automatically tighten the nut on the tension means.

5. In a device of the class described a connecting rod, bearing caps thereon, one of said caps provided with an enlarged aperture and countersunk to afford a socket seat, a tension rod pivotally connected to the other of said caps and extending loosely through the enlarged aperture in said apertured cap, a rounded adjusting nut on said tension rod, seating in said socket at various angled positions of the tension rod, and means automatically tightening said nut on said tension rod to take up the caps.

6. In a device of the class described the combination with the piston pin and the crank, of a connecting rod between the same, a cap on each end of the connecting rod and at one side thereof pivotally secured thereto, one of said caps provided with an enlarged aperture and countersunk to afford a recess, a tension rod pivotally connected to the other of said caps and extending loosely through the enlarged aperture in said apertured cap, a rounded adjusting nut on said tension rod, complementally formed to fit in said countersunk recess, and mechanism automatically tightening the nut on said tension rod to take up the caps.

7. A connecting rod and hinged bearing caps at each end thereof, a tension rod pivotally connected to one of said caps and slidably inserted through the other of said caps, said last mentioned cap countersunk to afford a concave seat, an adjusting nut having a convex end, threaded onto the lower end of said tension rod and formed complementally with the concave seat, to seat therein at various angled positions of said tension rod, and a torsion means connected to said adjusting nut adapted to automatically adjust and tighten said nut and the caps on their respective bearings.

In testimony whereof we have hereunto subscribed our names in the presence of two subscribing witnesses.

ALBERT E. COOK.
THOMAS VAN TUYL.

Witnesses:
CHARLES W. HILLS, Jr.
GEORGE R. MOORE.